Oct. 3, 1961     F. V. BARKER     3,002,312
MINNOW TRAP AND BUCKET
Filed Oct. 6, 1958
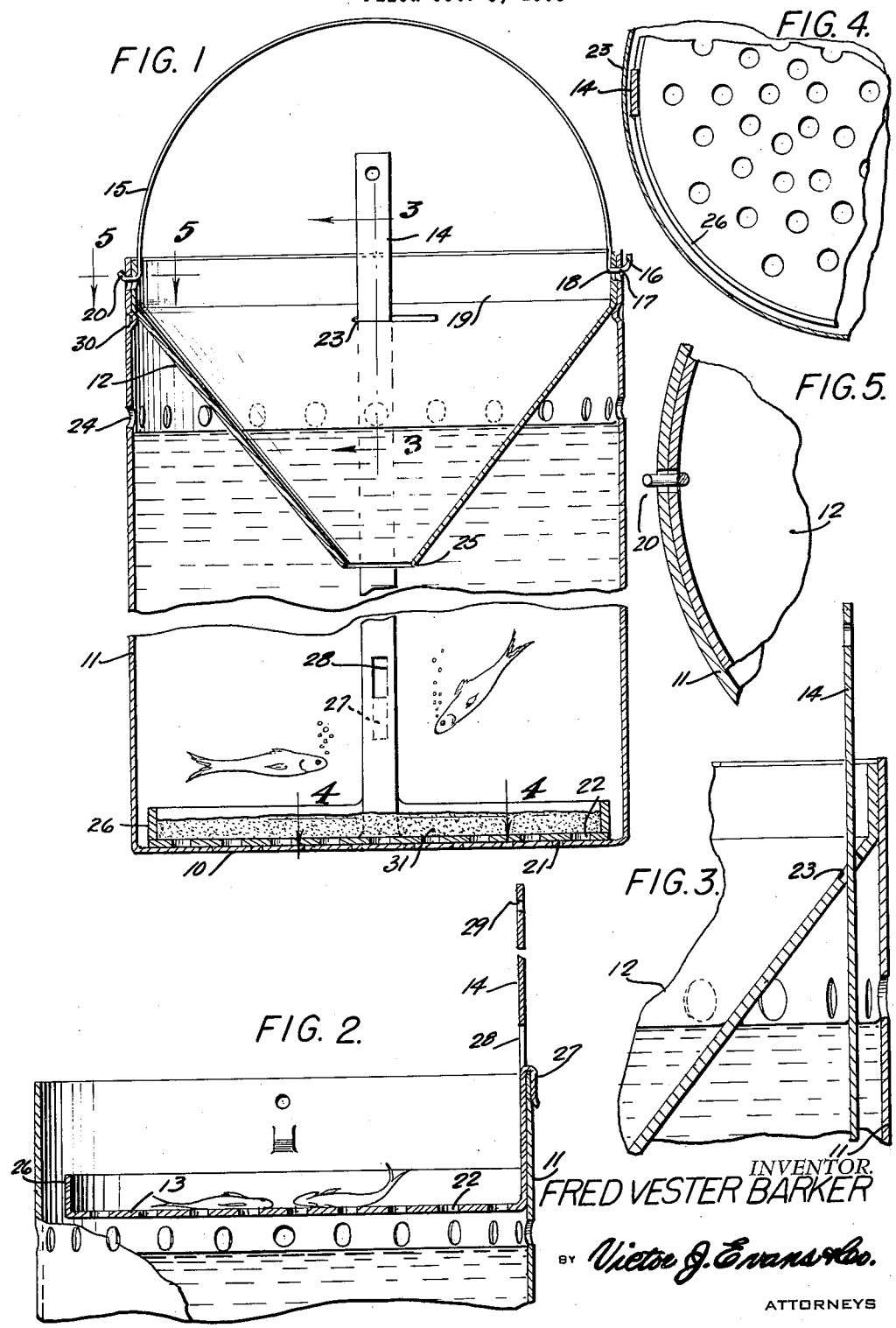
INVENTOR.
FRED VESTER BARKER
BY *Victor J. Evans & Co.*
ATTORNEYS

United States Patent Office 3,002,312
Patented Oct. 3, 1961

---

3,002,312
MINNOW TRAP AND BUCKET
Fred Vester Barker, Box 466, Rhodell, W. Va.
Filed Oct. 6, 1958, Ser. No. 765,469
5 Claims. (Cl. 43—56)

This invention relates to fishing tackle, and in particular a minnow bucket which, when turned upon its side, provides a trap and which may be turned to an upright position for retaining the minnows therein after the device contains a sufficient quantity of minnows.

The purpose of this invention is to provide means for catching and storing minnows in which the same device is used for both purposes so that handling of the minnows is obviated.

Minnow buckets have been provided of various types and designs and traps for minnows have also been provided in various designs, however, the conventional type of minnow bucket includes no provision for catching additional minnows and using a conventional trap for storing is not desirable as such a trap is soon overcrowded and in the conventional type of trap it is difficult to remove individual minnows.

With this thought in mind this invention contemplates a bucket having a base with a cylindrical wall and a funnel having an opening in the small end removably mounted in the upper end of the bucket and retained in operative position therein by a bail by which the bucket may be carried.

The object of this invention is, therefore, to provide a minnow bucket in which the cover extends downwardly into the bucket providing means for permitting minnows to enter the bucket and making it substantially impossible for the minnows to leave the bucket.

Another object of the invention is to provide a combination minnow bucket and trap in which individual minnows may readily be removed from the bucket.

A further object of the invention is to provide a combination minnow bucket and trap in which the device is of a simple and economical construction.

With these and other objects and advantages in view the invention embodies a bucking having a base with a cylindrical wall, and having a perforated disc positioned in the lower end and designed to be adjusted whereby perforations thereof are in registering relation with perforations in the base of the bucket, a frustro conical-shaped cover positioned with the small end extended downwardly into the bucket and a bail having a loop extended through the upper edge of the wall of the bucket and also through the upper edge of the cover and also having a prong on the opposite side positioned to extend through openings in the upper edges of the cover and wall of the bucket for retaining the bucket with the cover in a closed position, until it is desired to remove a minnow therefrom.

Other features and advantages of the invention will appear from the following description taken in connection with the drawing, wherein:

FIGURE 1 is a vertical section through the combined minnow bucket and trap showing the device with a cover providing a closure in the upper end of the bucket and with a bail extended upwardly above the upper end of the bucket.

FIGURE 2 is a vertical section through the upper part of the minnow bucket showing a dipper suspended from the upper edge of the wall of the bucket.

FIGURE 3 is a vertical section through one side of the bucket with the parts shown on an enlarged scale and taken on line 3—3 of FIGURE 1 showing an opening for the handle of the dipper through the conical-shaped cover of the bucket, parts of the bucket being broken away.

FIGURE 4 is a sectional plan through the intermediate part of the bucket taken on line 4—4 of FIGURE 1 and showing the perforations of the bucket and dipper.

FIGURE 5 is a sectional plan through the upper part of the bucket taken on line 5—5 of FIGURE 1 showing the funnel-shaped element secured in the bucket by a hook on the end of the bail.

Referring now to the drawing wherein like reference characters denote corresponding parts the improved minnow trap and bucket of this invention includes a base 10 having a cylindrical wall 11, a frustro-conical shaped closure 12, a dipper 13 having a handle 14 and a bail 15 with a loop 16 on one end extended through an opening 17 in the upper edge of the wall 11 and also through an opening 18 in the cylindrical flange 19 of the closure member 12, on one end and having a hook 20, which extends through openings in the flange 19 and wall 11, as shown in FIGURE 1, on the opposite end.

The base 10 of the bucket is provided with perforations 21 that are positioned in registering relation with perforations 22 in the base of the dipper 13. With the handle 14 of the dipper positioned in a slot 23 in the conical-shaped closure 12 the openings in the base of the dipper may be positioned to register with the openings 21 in the base 10 of the bucket and with the handle slightly turned the openings are adjusted to unregistering positions whereby the weight of water in the bucket will secure the base of the dipper against the upper surface of the base 10 of the bucket so that the bucket will hold water.

The length of the slot 23 is greater than the width of the handle 14 so that the dipper may hang freely to facilitate removal of the cone 12 from the bucket.

The upper part of the wall 11 of the bucket is provided with perforations 24 that permit water in the bucket to escape but, prevent minnows or other fish escaping from the bucket.

The small end 25 of the frustro-conical shaped closure 12 permits minnows to pass into the bucket with the bucket in a horizontal position but being of a comparatively small diameter, prevents the minnows escaping from the bucket.

The dipper 13 is provided with a flange 26 and the handle 14 is provided with a clip 27 that is struck from an opening 28 and the handle is positioned to extend over the upper edge of the wall 11 of the bucket, as shown in FIGURE 2. By this means the dipper or tray may be positioned in the upper part of the bucket to facilitate selecting minnows therefrom. The upper end of the handle 14 is also provided with an opening 29 to facilitate hanging the dipper on a nail, hook, or the like.

With the parts assembled as illustrated and described the bucket may be placed upon its side so that minnows will pass through the cone or conical-shaped closure 12 into the interior of the bucket or trap and after a sufficient number of minnows are in the trap the device is moved to the upright position providing a minnow bucket with the bail 15 extended upwardly.

With the hook 20 removed from the hole in the upper edge of the wall 11 of the bucket and flange 19 of the conical-shaped closure the closure may be removed, the loop 16 providing a hinge whereby with the outside diameter of the flange 19 less than the inside diameter of the wall of the bucket the cone may swing to an open position to facilitate dipping or otherwise removing minnows from the bucket.

The bucket and cone are formed of relatively thin metal whereby with the loop 16 extended through the enlarged openings 17 and 18 the parts form a hinge with the cone swinging upwardly and with the dipper 13 hanging freely. The comb and dipper may be supported in the upper end of the bucket by other means.

As shown in FIGURE 1 the cone rests upon a continuous annular ridge 30 extended inwardly on the inner surface of the wall of the bucket.

In order to prevent the trap moving in surf or shallow water a small amount of sand, as indicated by the numeral 31, may be placed in the bottom of the bucket. It will also be understood that other means may be provided for anchoring the trap in the water.

The bucket may be cylindrical, as shown or of any other suitable shape in cross-section.

It will be understood that modifications, within the scope of the appended claims, may be made in the design and arrangement of the parts without departing from the spirit of the invention.

What is claimed is:

1. A minnow bucket including a perforated base with a cylindrical wall extended upwardly therefrom, a frustro conical-shaped element providing a closure positioned in the upper end of the bucket with the small end extended downwardly into the bucket, means for hinging the closure in the bucket, a dipper having a perforated base positioned in the bucket and having a handle extended upwardly through the wall of said frustro-conical-shaped element, the perforations of the dipper being positioned to, selectively, register with the perforations of the base of the bucket or to register with blank areas between the perforations of the base of the bucket for closing the bottom of the bucket and a bail extended upwardly from the upper edge of the wall of the bucket.

2. A minnow bucket comprising a base having a cylindrical wall extended upwardly therefrom and having perforations in the base and in the wall, a frustro conical-shaped closure having a flange on the large end designed to nest in the upper edge of the wall of the bucket and having an opening in the small end which extends downwardly into the bucket, a dipper having a perforated base positioned in the bucket and having a handle extended upwardly through the wall of said frustro-conical-shaped element, the perforations of the dipper being positioned to selectively register with the perforations of the base of the bucket or to register with blank areas between the perforations of the base of the bucket for closing the bottom of the bucket and a bail having a loop on one end extended to the flange of the closure and upper edge of the wall of the bucket providing a hinge and having a hook on the opposite end and extended through openings in the flange of the closure and wall of the bucket.

3. A minnow bucket comprising a perforated base and an endless wall extended upwardly from the periphery of the base, said endless wall having perforations therein and said perforations being spaced downwardly from the upper edge of the wall, a dipper having a perforated base and having a handle extended upwardly therefrom positioned in the bucket, the perforations of the dipper being positioned to selectively register with the perforations of the base of the bucket or to register with blank areas between the perforations of the base of the bucket for closing the bottom of the bucket, a frustro conical-shaped closure having a cylindrical flange on the upper or large end and an opening in the depending or small end, the flange having openings therethrough and the handle of the dipper extended upwardly through an opening in the closure, and a bail having a loop extended through openings in the flange of the closure and upper end of the wall of the bucket providing a hinge at one end and having a hook extended through openings in the flange of the closure and upper edge of the wall from the opposite end.

4. In a minnow bucket and trap, the combination which comprises a perforated base having an endless wall extended upwardly from the periphery thereof, said wall having perforations therein, the perforations being spaced downwardly from the upper edge of the wall, and the inner surface of the wall having an annular rib thereon, a frustro conical-shaped closure mounted in an inverted position with a flange on the large end extended upwardly and nested in the wall of the bucket, the lower or smaller end having an opening therethrough, a dipper positioned in the lower part of the bucket and having a handle extended through the closure, said dipper having a perforated base with the perforations of the dipper being positioned to selectively register with the perforations of the base of the bucket or to register with blank areas between the perforations of the base of the bucket for closing the bottom of the bucket and a bail positioned with one end providing a hinge pivotally connecting the closure to the upper edge of the wall of the bucket and with the other end providing latching means for retaining the closure in the bucket.

5. A minnow bucket including a base with a cylindrical wall extending upwardly therefrom, the upper portions of the wall and the base of the bucket being provided with a plurality of spaced apart perforations, a frustro-conical shaped element providing a closure positioned in the upper end of the bucket with the small end extended downwardly into the bucket, means for hinging the closure in the bucket, a dipper having a perforated base of circular formation positioned in the bucket and having a handle extended upwardly therefrom said handle being arranged at right angles with respect to the circular base of said dipper, said handle adapted to be manually actuated whereby the perforated base of the dipper can be moved towards and away from the base of said bucket and said dipper also being movable to a position where the perforations in the base of the dipper can be selectively placed in registration with the perforations in the base of the bucket or in registration with the blank areas between the perforations of the base of the bucket for closing the bottom of the bucket, and a bail extended upwardly from the upper edge of the wall of the bucket.

References Cited in the file of this patent

UNITED STATES PATENTS

| | | |
|---|---|---|
| 247,690 | Rodman | Sept. 27, 1881 |
| 302,086 | Barton | July 15, 1884 |
| 504,526 | Hemp | Sept. 5, 1893 |
| 1,231,034 | Love | June 26, 1917 |
| 2,720,049 | Basky | Oct. 11, 1955 |